UNITED STATES PATENT OFFICE.

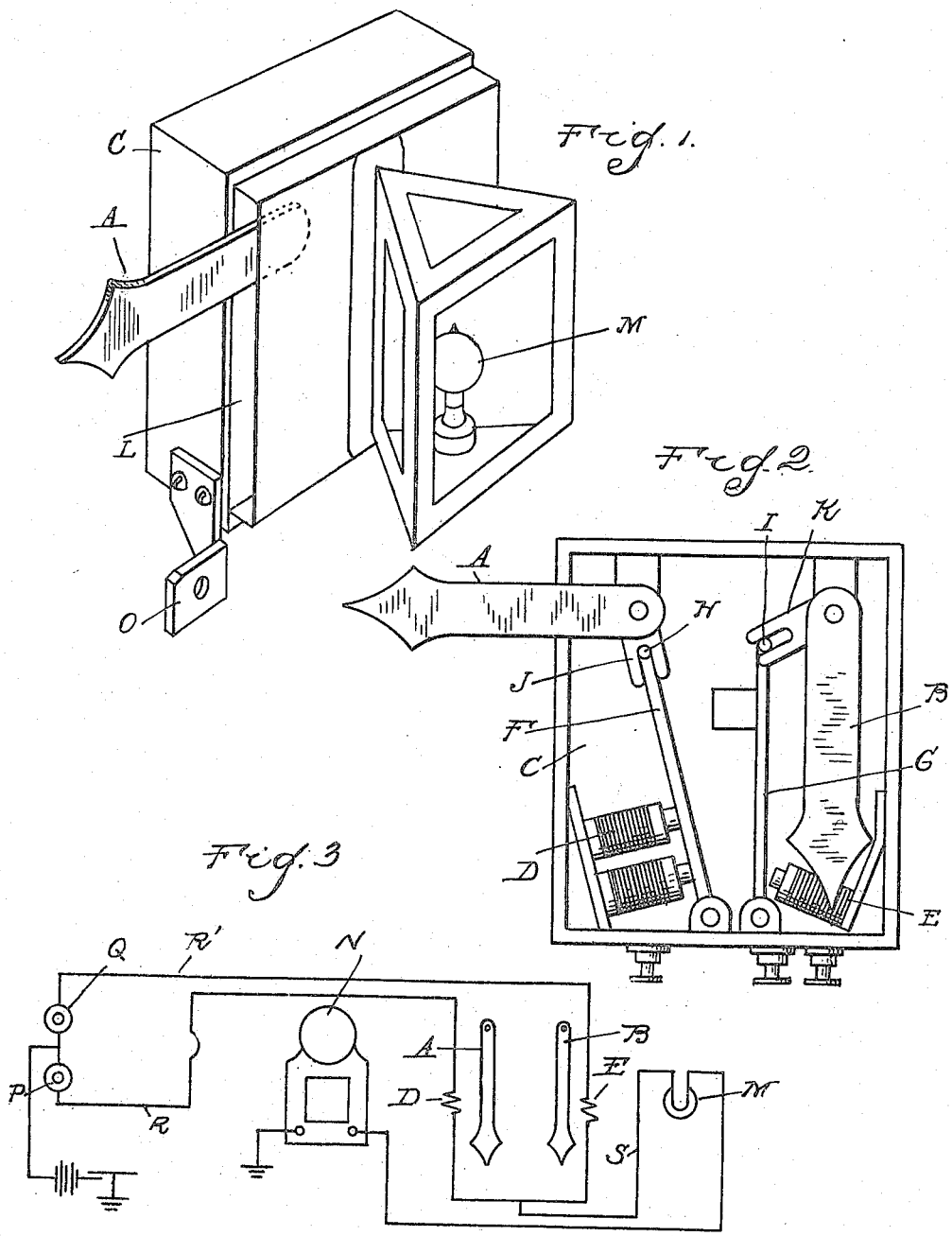

LAURANCE J. HORAN, OF DETROIT, MICHIGAN.

INDICATOR FOR VEHICLES.

1,161,130.  Specification of Letters Patent.  Patented Nov. 23, 1915.

Application filed July 11, 1913. Serial No. 778,487.

*To all whom it may concern:*

Be it known that I, LAURANCE J. HORAN, a subject of the King of Great Britain and Ireland, residing at Detroit, in the county of Wayne and State of Michigan, have invented certain new and useful Improvements in Indicators for Vehicles, of which the following is a specification, reference being had therein to the accompanying drawings.

The invention relates to indicators and has for its particular object the obtaining of a construction by which the driver may signal his intention to turn either to the right or the left.

It is a further object to combine visual and audible signals in such a manner as to call attention to the intended movement.

The invention consists in various features of construction as hereinafter set forth.

In the drawings: Figure 1 is a perspective view of the signal apparatus. Fig. 2 is a rear elevation with the lamp removed. Fig. 3 is a diagram illustrating the arrangement of the electric circuits.

In the present state of the art, it is usual for the driver of an automobile, who intends to turn his vehicle, to signal this intention to any one in the rear by extending either his right or left hand, according to the direction of turning. A somewhat similar signal is given where he merely intends to stop. Such signals, however, can only be used in daylight, and at night time the only indication is the usual tail-light of the vehicle.

With the present construction, provision is made for displaying a signal in the rear of the vehicle, which is visible equally well in daylight or at night, and which plainly indicates the particular movement intended, whether this be the turning to the right or the left or the stopping of the vehicle. Furthermore, this visual signal is combined with an audible signal, and may, if desired, be further combined with the tail-light, so as to avoid unnecessary complexity or multiplicity of accessories on the vehicle.

The visual signals which I preferably employ are index hands A and B arranged to extend respectively to the left and right, and thereby indicate the direction of turning. The stopping of the vehicle may also be indicated by operating both of these hands simultaneously. The hands A and B are operated preferably through electromagnetic mechanism, and, as shown, C is a box or casing containing a pair of electromagnets D and E for operating pivotal armatures F and G respectively connected by pins H and I with slotted rock arms J and K for turning the hands A and B. The hands are normally concealed within the box, but are arranged in registration with slots L in the sides, so that when either electro-magnet is energized the corresponding hand will be swung outward through the slot L and displayed to view. For indicating this movement in the night time, a lamp M is mounted in rear of the box or casing C and is so positioned as to illuminate the hands on each side of the box. If the same light is used as a tail-light, the usual red glass panel may be placed in rear while the white light is used to illuminate the hands.

In addition to this visual signal, an audible signal N, preferably an electric bell, is mounted on the casing C, preferably on the forward side thereof. The whole casing may then be suitably mounted upon the vehicle, as by means of brackets O which may be secured to the mounting for the license number, or in any other convenient position in the rear of the vehicle.

Any suitable arrangement of the electric circuits may be used for operating this signal, but, as shown, P and Q are two push buttons arranged in a position for convenient operation by the driver. The push button P is connected in an electric circuit R which operates the magnet D for the indicator hand A, while the push button Q is in a branch circuit R', which operates the magnet E for the hand B. Both branch circuits are connected to a common circuit S which includes the lamp M and the bell N, so that the manipulation of either of the switches will sound the bell and display the light at the same time that the hand is operated to indicate the direction of turning. If the lamp M is employed as a tail-light and consequently it is necessary to maintain it in continuous operation, a modified arrangement may be used, in which the lamp is merely flashed by the operation of the push buttons. Various arrangements well known in the art may be used for this purpose, and I have therefore omitted showing the same in the drawings.

In use, the driver may manipulate the push buttons P and Q alternatively to indicate his intention of turning to the left or right, and by pressing both buttons simultaneously may indicate his intention to stop. The sounding of the bell simultaneously will enforce the attention of any one in the rear, and therefore adds a further element of safety.

What I claim as my invention is:

1. An indicator for vehicles, comprising a casing, a pair of electro-magnets therein, index hands respectively operated by said electro-magnets to be extended to the left, to the right or both simultaneously, an electro-magnetically operated audible signal with means for operating said signal simultaneously with the hands, a triangular casing, a lamp within said casing, said casing having a colored glass in rear and uncolored glass in the other two sides, allowing light to show upon the hands when extended, and a common mounting for all.

2. An indicator for vehicles, comprising a casing, a pair of electro-magnets therein, index hands operated by said electro-magnets to be extended out from and at the respective sides of said casing, a second casing attached to the front of the first-mentioned casing, and a lamp within said second casing allowing light to show backward and to show upon the said index hands when extended.

In testimony whereof I affix my signature in presence of two witnesses.

LAURANCE J. HORAN.

Witnesses:
ADELAIDE I. ADAMS,
JAMES P. BARRY.

Copies of this patent may be obtained for five cents each, by addressing the "Commissioner of Patents, Washington, D. C."